United States Patent [19]
Hamburg

[11] Patent Number: 5,808,623
[45] Date of Patent: Sep. 15, 1998

[54] SYSTEM AND METHOD FOR PERSPECTIVE TRANSFORM IN COMPUTER USING MULTI-PASS ALGORITHM

[75] Inventor: Mark Hamburg, Scotts Valley, Calif.

[73] Assignee: Adobe Systems Incorporated, San Jose, Calif.

[21] Appl. No.: 727,375

[22] Filed: Oct. 7, 1996

[51] Int. Cl.$^6$ .................................................. G06T 15/20
[52] U.S. Cl. ...................... 345/433; 345/425; 345/430; 345/436
[58] Field of Search ................................... 345/425, 426, 345/427, 429, 430, 431, 432, 433, 435, 436, 437, 438, 439, 121, 139

[56] References Cited

U.S. PATENT DOCUMENTS

| | | | |
|---|---|---|---|
| 4,841,292 | 6/1989 | Zeno ........................................ | 345/121 |
| 5,204,944 | 4/1993 | Wolberg et al. ......................... | 345/427 |
| 5,247,583 | 9/1993 | Kato et al. ............................... | 382/164 |
| 5,392,385 | 2/1995 | Evangelisti et al. ..................... | 345/431 |
| 5,550,960 | 8/1996 | Shirman et al. ......................... | 345/430 |
| 5,579,456 | 11/1996 | Cosman .................................. | 345/428 |

OTHER PUBLICATIONS

Dudgeon, "Algorithm for graphics texture mapping", System Theory, 1991 Southeastern Symposium, pp. 613–617.
Yanping et al., "Direct shape reconstruction of 3–D object from monocular shading image", IEEE Tencon'93, p. 952–955.
Demirer et al., "Texture mapping using clustering techniques", Mediterranean Electrotechnical Conference, 1994, pp. 355–358.
Zhang, "A fuzzy approach to digital image warping", IEEE Computer Graphics and Application Magazine, vol. 16, issue 4, Jun. 1993, pp. 34–41.
Blatner, David et al., *Real World Photoshop 3 Industrial Strength Production Techniques*, pp. 453–455 (1996).
FITS Imaging et al., *Live Picture*, pp. 108–111 (1994).
Wolberg, George, *Digital Image Warping*, pp. 52–56, 214–219 (1990).
Meyers, Scott, *More Effective C++*, pp. 190–194 (1996).

*Primary Examiner*—Joseph H. Feild
*Assistant Examiner*—Stephen Hong
*Attorney, Agent, or Firm*—Fish & Richardson P.C.

[57] ABSTRACT

A multi-pass algorithm for applying a perspective transform to quadrilateral images by means of at least two phases of 1-dimensional resampling processes for each dimension. Each phase constitutes a perspective transform from a rectangle to a trapezoid with parallel sides parallel to the corresponding sides of the rectangle. More particularly, each phase comprises a foreshortening pass in one dimension (vertical for parallel horizontal sides, horizontal for parallel vertical sides) followed by a trapezoidal pseudo-shear pass in the other dimension. Thus, in the first phase, the source rectangle is transformed to a first, intermediate trapezoid with either parallel horizontal or parallel vertical sides. In the second phase, the bounding box of this intermediate trapezoid (i.e., the smallest axis-aligned rectangle containing the trapezoid) is transformed to a second, target trapezoid with either parallel vertical or parallel horizontal sides (i.e., the opposite of the intermediate trapezoid) that bounds the final quadrilateral. Thus, by so transforming the bounding box of the intermediate trapezoid, the corners of the intermediate trapezoid are mapped to the corners of the target quadrilateral. The invention has two advantages over the prior art processes: although some complex calculations have to be performed for each row or column, the per pixel calculations are much simpler; and since the shape of the result is a simple trapezoid (remembering that a rectangle is a trapezoid) at each step, it is easy to control the resampling process to ensure that these shapes are achieved and the result appears stable.

45 Claims, 3 Drawing Sheets

SYSTEM AND METHOD FOR PERSPECTIVE TRANSFORM IN COMPUTER USING MULTI-PASS ALGORITHM

BACKGROUND OF THE INVENTION

1. Field of the Invention

This invention relates to systems and methods for transforming images in computer systems, and more particularly to a system and method for perspective transform in a computer.

2. Description of Related Art

Figure 1:
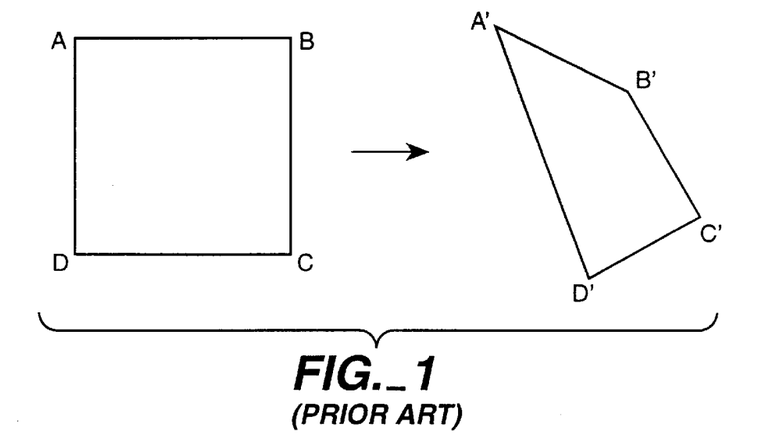
FIG. 1 is a block diagram of a prior art general perspective transform that transforms a rectangle defined by vertices A, B, C, and D to a perspective quadrilateral defined by vertices A', B', C', and D'.

In image manipulation computer programs, such as Photoshop 3.0 from Adobe Systems Incorporated, a graphics image is often "resampled" to transform the image from one depiction to another. One type of resampling transform is known as a "perspective transform". The perspective transform maps an axis-aligned rectangle (i.e., the sides of the rectangle are aligned with an underlying XY axis plane; since all rectangles can be axis-aligned by rotating them, all references herein to rectangles are to axis-aligned rectangles) to an arbitrary convex, non-degenerate quadrilateral ("non-degenerate" means that no three vertices of the quadrilateral are collinear). The perspective transform subsumes the affine transforms, such as scaling, rotation, and shearing. FIG. 1 is a block diagram of a general perspective transform that transforms a rectangle defined by vertices A, B, C, and D to a perspective quadrilateral defined by vertices A', B', C', and D'.

In general, a perspective transform can be used to directly map arbitrary convex quadrilaterals to other arbitrary convex quadrilaterals by surrounding the initial quadrilateral with a bounding rectangle and deriving a corresponding transformed quadrilateral. The general transformation can also be performed by using an inverse transform to map an initial quadrilateral to a rectangle and then mapping from that rectangle to the final quadrilateral. Further, the composition of two perspective transforms is a perspective transform. Finally, note that there exists exactly one perspective transform mapping a particular rectangle to a particular convex quadrilateral. Thus, implementation of a perspective transform that maps a rectangle to a quadrilateral is in fact implementation of the perspective transform defined by that rectangle and quadrilateral. For further information on perspective transforms, see George Wolberg, *Digital Image Warping*, IEEE Computer Society Press, 1990.

More particularly, the general problem of image transformation involves defining a mapping from source coordinates <u, v> to target coordinates <x, y>. This is known as a forward mapping. (Image transformation can also be defined in terms of a map going from target coordinates to source coordinates, in which case it is known as a backward n mapping). A mapping can be defined that carries the vertices or "corners" of a source rectangle to the corresponding comers of a target quadrilateral. There are infinitely many such mappings. However, the perspective transform is the only mapping that preserves straight lines—i.e., the only one for which all points on a straight line in the source will be points on a straight line in the target. The general form of the perspective transform is:

$$<u,v> \rightarrow <(au+bv+c)/(gu+hv+1), (du+ev+f)/(gu+hv+1)> \quad \text{Eq.1}$$

A transform is called separable if it can be broken into a series of mappings through intermediate images such that each mapping is of the form:

$$<u,v> \rightarrow <x,v> \text{ or } <u,v> \rightarrow <u,y>$$

Thus, each mapping only changes one component of the coordinates. Separable transforms can be implemented as a series of passes using intermediate images in which the process of building each image consists in applying a 1-dimensional resampling process to each row or column in the previous image. The resampling function may be different in each row or column. A key point is that there is no "cross talk" between rows or columns, respectively. Such a resampling can be expressed as:

$$<u,v> \rightarrow <F_v(u),v>$$

where $F_v(u)$ is a function of both v and u. This notation is used, as opposed to $F(u,v)$, to emphasize the fact that a function is being applied along only one dimension (i.e., to each row). The vertical mapping has the form:

$$<u,v> \rightarrow <u,G_u(v)>.$$

Accordingly, using 1-dimensional resampling, a 2-dimensional image can be mapped using a horizontal and a vertical resampling (in either order). Thus, when resampling horizontally, all pixels in the target image have their value determined strictly by pixels lying in the corresponding row in the source image. Similarly, when resampling vertically, all pixels in the tar get image have their value determined by pixels lying in the corresponding column in the source image. A variety of sampling and interpolation algorithms can be used to determine the specific value written to the target pixels.

Wolberg presents a 2-pass perspective transform which performs the following mapping:

$$<u,v> \rightarrow <x,v> \rightarrow <x,y>$$

In the first pass, $x=(au+bv+c)/(gu+hv+1)$, as in Eq. 1. For fixed v (i.e., for any given row), this has the reduced form $(au+t)/(gu+w)$, where t and w vary from row to row.

In the second pass, each of the columns needs to be remapped to bring all points into appropriate vertical position. Solving for y in terms of u and v is straightforward, but y must be determined as a function of x and v. Wolberg works through the mathematics and arrives at a function in which $y=(jx+kv+mxv+n)/(pv+1)$. For fixed x(i.e., for any given column), this has the form $(qv+r)/(pv+1)$, where q and r vary from column to column.

Analogous logic applies when using a vertical resampling operation followed by a horizontal resampling operation.

Problems with this 2-pass approach include:

(1) It requires a division operation for every pixel sampled in each pass. This is significant because division operations are generally relatively "expensive" compared to other arithmetic operations and can be quite expensive on some hardware (e.g., certain digital signal processing chips).

(2) In the general case, at least one edge of the source rectangle will be transformed from a straight line into a curve in the first pass. This makes it much harder to control for numeric errors since the resultant shape is no longer easily described. Such errors are accentuated by the use of integer arithmetic which, in the presence of a divide operation, can produce widely varying results when the divisor becomes small. However, it is frequently desirable to use (faster) integer arithmetic because of the amount of computation involved. Failure to control these effects can result in severe artifacts in the transformed image.

Another known algorithm for a perspective transform operates on the pixels in a source rectangle and transforms them to a target trapezoid having at least two parallel sides that are parallel to the corresponding sides of the rectangle. This transform also operates in two passes, and is, in fact, a special case of Wolberg's more general 2-pass transform and his mathematics can be used to derive the necessary coefficients. In the case of parallel horizontal sides, the first pass is a vertical foreshortening in which the rectangle is mapped to another rectangle of equal width but possibly differing height via the following transform:

<u,v>→<u,(av+b)/(cv+1)>

In the second pass, each row of the target trapezoid is generated by resampling the corresponding row of the intermediate rectangular image using uniform resampling. The end points of a row in the target trapezoid are simple linear functions of the vertical coordinate and the transform takes the form:

<u,y>→<du+ey+fuy+g, y>

This second pass is referred to as a trapezoidal pseudo-shear because the operation performed on each row corresponds to the operation performed during a shear. The trapezoidal pseudo-shear pass actually transforms the image from a rectangle to a trapezoid, but the foreshortening pass is needed to ensure that straight lines in the source image remain straight in the resulting image. Neither pass by itself is a perspective transform, but their combination forms a perspective transform. The case with parallel vertical sides is analogous.

Figure 2:
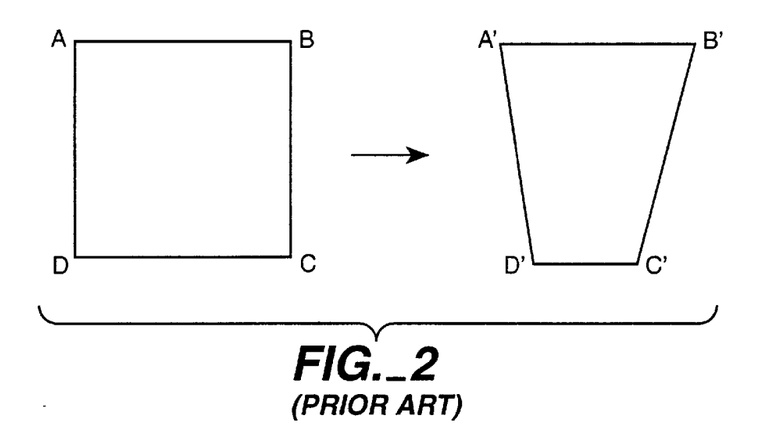
FIG. 2 is a block diagram of a trapezoidal perspective transform that transforms a rectangle defined by vertices A, B, C, and D to a perspective trapezoid defined by vertices A', B', C', and D'.

FIG. 2 is a block diagram of a trapezoidal perspective transform that transforms a rectangle defined by vertices A, B, C, and D to a perspective trapezoid defined by vertices A', B', C', and D'. Notes that lines A'-B'and C'-D' are parallel to each other and to the corresponding lines A-B and C-D.

This transform does not suffer from the problems of the general case because the division operations are only required on a per row or column basis rather than on a per pixel basis and the intermediate shape is a rectangle and hence easy to ensure thereby lending stability to the results. The limitation of this algorithm is that it only handles this specific special case.

Perspective transformations may be augmented by transposition and/or flip (horizontal or vertical) operations in order to rotate the original source rectangle into roughly the right position. These additional operations do not require complex interpolation themselves since they just rearrange existing pixel values. These operations do serve to reduce the amount of resampling (and hence the amount of potential image degradation) that needs to be performed. Accordingly, these operations will be referred to as "orienting operations" and they may be performed before or after a perspective transformation.

It would be desirable to be able to perform a general quadrilateral to quadrilateral perspective transform without the limitations of the current methods. The present invention provides a system and method for perspective transform that avoids the limitations of such methods.

SUMMARY OF THE INVENTION

The invention includes a multi-pass algorithm for applying a perspective transform to quadrilateral images by means of at least two series of 1-dimensional resampling processes for each dimension. In the preferred embodiment, the invention essentially transforms a rectangle to an intermediate trapezoid in a first phase, and from the intermediate trapezoid to a final quadrilateral in a second phase in which the rectangular bounding box of the first trapezoid is transformed to a second trapezoid. Each phase comprises two 1-dimensional sampling passes: a foreshortening pass in one dimension (vertical for parallel horizontal sides, horizontal for parallel vertical sides) followed by a trapezoidal pseudo-shear pass in the other dimension. Each phase is in and of itself a perspective transform, and hence the result is a perspective transform. A key benefit of 1-dimensional resampling is that more complex sampling and interpolation algorithms can be used since they only need to work with 1-dimensional rather than 2-dimensional data.

The invention has two advantages over the prior art processes: although some complex calculations have to be performed for each row or column, the per pixel calculations are much simpler; and since the shape of the result is a simple trapezoid (remembering that a rectangle is a trapezoid) at each step, it is easy to control the resampling process to ensure that these shapes are achieved and the result appears stable.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

The inventive method breaks the general perspective transform into two phases each of which consists of two 1-dimensional resampling passes. Each phase constitutes a perspective transform from a rectangle to a trapezoid with parallel sides parallel to the corresponding sides of the rectangle. More particularly, each phase comprises two 1-dimensional sampling passes: a foreshortening pass in one dimension (vertical for parallel horizontal sides, horizontal for parallel vertical sides) followed by a trapezoidal pseudo-shear pass in the other dimension. Thus, in the first phase, the source rectangle is transformed to a first, intermediate trapezoid with either parallel horizontal or parallel vertical sides. In the second phase, the bounding box of this intermediate trapezoid (i.e., the smallest axis-aligned rectangle containing the trapezoid) is transformed to a second, target trapezoid with either parallel vertical or parallel horizontal sides (i.e., the opposite of the intermediate trapezoid) that bounds the final quadrilateral. Thus, by so transforming the bounding box of the intermediate trapezoid, the corners of the intermediate trapezoid are mapped to the corners of the target quadrilateral.

The detailed mathematics of the passes are discussed above and in Wolberg. A key point to observe is that these passes are considerably simpler than the passes in the general case of Wolberg's 2-pass algorithm. The foreshortening pass still requires a division, but since the second component is independent of the first component, only one division per row or column is required, instead of one division per pixel. The foreshortening operation also maintains visual stability by mapping a rectangle to a rectangle and moving entire rows or columns together as rows or columns. The trapezoidal pseudo-shear pass eliminates division entirely (unless introduced on a per row or per column basis as part of a backward mapping implementation), and hence avoids both efficiency and numerical stability concerns.

A key innovation is the recognition in this invention that (1) the intermediate trapezoid can be converted to the final quadrilateral by the stratagem of representing the intermediate trapezoid as being in a rectangular bounding box and then converting the bounding box to a trapezoid using simple 1-dimensional sampling passes, and (2) the resulting trapezoid bounds the final quadrilateral.

Thus, the inventive perspective transformation consists of a total two phases totaling four passes (or the analogous sequence of steps with the roles of horizontal and vertical reversed):

(1) a vertical foreshortening;
(2) a horizontal trapezoidal pseudo-shear;
(3) a horizontal foreshortening; and
(4) a vertical trapezoidal pseudo-shear.

A preliminary or concluding set of orienting operations may be performed to simplify or stabilize the general perspective transform.

Phase Passes

The following discussion covers the case which begins with a vertical foreshortening pass. The case which begins with a horizontal foreshortening pass is analogous. The coordinates of a source rectangle are mapped to a target quadrilateral through two major phases of transformation each involving 2 passes. This takes the coordinates through the steps:

$$<u,v> \rightarrow <u,q> \rightarrow <p,q> \rightarrow <x,q> \rightarrow <x,y> \quad \text{Eq.2}$$

where <u,v> are coordinates in the source image and <x,y> represent the coordinates of the target image. See also FIG. 3, described below.

The first phase of the inventive method transforms the rectangle bounding the source image to an intermediate trapezoid with parallel horizontal edges. This transformation occurs in two passes:

(1) A vertical foreshortening pass in which the pixel at <u,v> in the source image is mapped to <u,f(v)> in the intermediate image where f(v) is of the form (av+b)/(cv+1). Depending on the resampling algorithm used, this may actually mean that the pixel at <u,q> in the intermediate image is determined by sampling the source image at <u,f$^{-1}$(q)> (i.e., the inverse function). This approach is readily supported since f is invertible. The operation is called "foreshortening" because it provides the compression and expansion associated with foreshortening. Since the same values are used in each column, relatively complex calculations—including floating point division—can be performed for each row without having this cost become significant relative to the resampling cost.

(2) A horizontal pass in which each row in the first intermediate image is uniformly resampled to the corresponding row in a second intermediate image (i.e., the intermediate trapezoid) such that the points at the left and right edges of the source rectangle are mapped to the left and right intersections of the row with the edges of the intermediate trapezoid. This mapping is again invertible and hence we can use a variety of sampling algorithms based either on forward mapping or backward mapping. In either case, the per pixel mathematics for uniform resampling is simple. The end points for each row are simple linear functions of the vertical coordinate. When using a resampling algorithm based on backward mapping, a division per row may be required to determine the rate at which to sample, but the cost of this is negligible compared to the resampling cost. This operation is referred to as a "trapezoidal pseudo-shear" since the operation performed on each row corresponds to the operation performed when shearing (in a true shear, the trapezoid would be a parallelogram).

The second phase of the inventive method transforms the bounding box of the intermediate trapezoid to a second trapezoid, this time having parallel vertical edges. In so doing, this phase transforms the intermediate trapezoid contained within the bounding box to the target quadrilateral. The second phase consists of 2 passes:

(1) A horizontal foreshortening pass in which each pixel <p,q> in the bounding box of the intermediate trapezoid is mapped to <g(p), q>, where g(p) is of the form (dp+e)/(fp+1). Again, g is invertible, so resampling algorithms can be used based on either forward or backward mapping. Since the same values are used in each column, relatively complex calculations—including floating point division—can be performed for each column without having this cost become significant relative to the resampling cost.

(2) A vertical pass in which each column of the bounding box of the intermediate trapezoid is uniformly resampled such that the top and bottom edges of the box are carried to the intersection of the column with the edges of the second trapezoid. Again, this mapping is invertible and hence a variety of sampling algorithms can be used based either on forward mapping or backward mapping. In either case, the per pixel mathematics for uniform resampling is simple. The end points for each column are simple linear functions of the horizontal coordinate. When using a resampling algorithm based on backward mapping, a division per column may be required to determine the rate at which to sample, but the cost of this is negligible compared to the resampling cost.

Observe that each step is invertible and hence, not only can a variety of sampling algorithms be used based on forward or backward mapping, but an implementing system can work backward through any step to find out where a given coordinate in a resulting image came from in the preceding image.

Thus, the invention accomplishes a perspective transform in a total for four passes, compared to two passes for the prior art. While four passes would hardly seem an improvement over two passes, four passes give the following unexpected benefits:

(1) The per pixel computations are considerably simpler in each sampling operation with the bulk of the computation being done per row or per column;

(2) At each stage, an operation is being performed that is reasonably stable numerically and hence the overall image resampling is easier to keep stable.

Example of Perspective Transform

Figure 3:
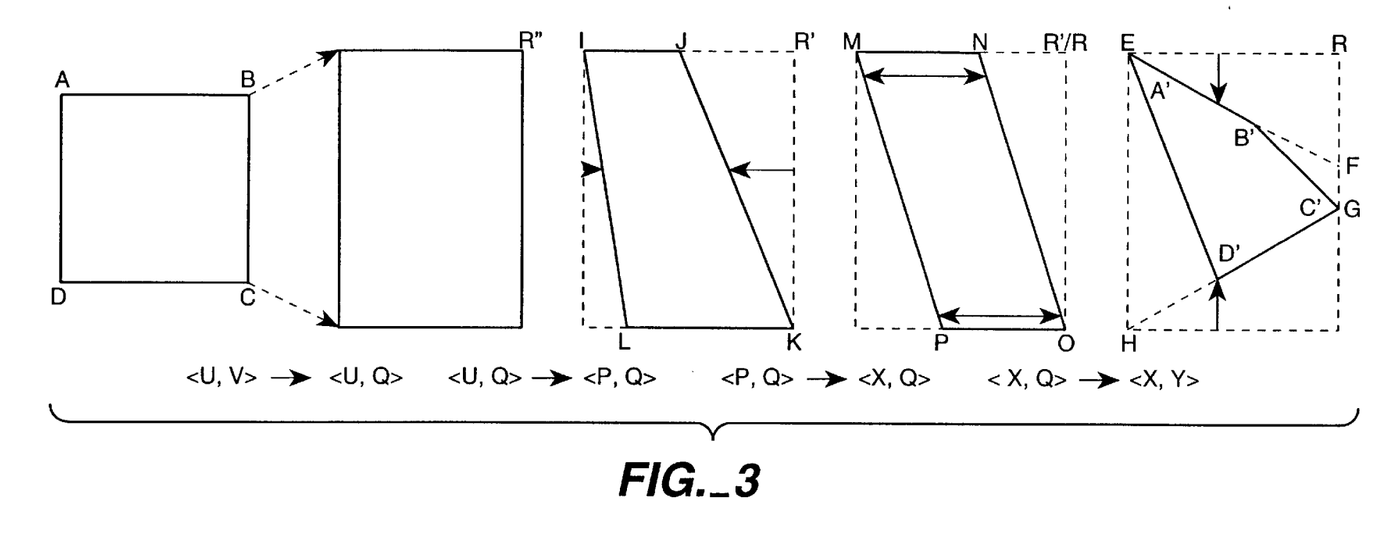
FIG. 3 is a block diagram showing geometrically how to derive the relevant transformation parameters for implementing the invention.

FIG. 3 is a block diagram showing geometrically how to derive relevant transformation parameters for implementing the invention. Note that other methods may be used to derive such parameters.

A source rectangle defined by vertices A, B, C, and D is to be transformed to a perspective target quadrilateral defined by vertices A', B', C', and D'. The source rectangle contains the image to be transformed. The vertices or edges of the target quadrilateral would be defined by a user, using, for example, a pointing device to draw or indicate the vertices or edges.

In accordance with the invention, the source rectangle is first converted to an intermediate trapezoid in the first phase, and then a rectangle bounding the intermediate trapezoid is converted to the target trapezoid in the second phase. In so doing, the source rectangle is mapped to the target quadrilateral. To find the values of the mapping functions, the algorithm works backwards from the target quadrilateral to the source image. Assuming that the intermediate trapezoid is to have its horizontal edges parallel, the inventive method involves the following steps:

(1) Let A', B', C', and D' be vertices defining the target quadrilateral (rightmost drawing in FIG. 3);

(2) Draw vertical lines through the "leftmost" and "rightmost" of A', B', C', and D' (which would be A' and C' in the example shown in FIG. 3).

(3) Select a pair of opposite sides of the target quadrilateral. Preferably these sides should be the more horizontal pair. In particular, neither of the chosen sides should be vertical. Since the sides adjacent to a vertical side cannot be vertical (ensured by the non-degeneracy requirement for a quadrilateral), there must exist such a pair. In the example shown, these sides are A'-B' and C'-D'.

(4) Draw lines through the sides selected in Step (3). In the example shown, these lines intersect the lines drawn in Step (2) in 4 places: vertices E, F, G, and H. These points form a trapezoid with vertical parallel edges.

(5) Construct an axis-aligned rectangle R bounding E, F, G, and H. The second trapezoidal perspective transformation will map rectangle R to the trapezoid defined by E, F, G, and H. The coefficients for the resampling function to transform axis-aligned rectangle R to axis-aligned parallel-sided trapezoid EFGH can be found using conventional methods for mapping a rectangle to an axis-aligned parallel-sided trapezoid.

(6) Using the inverse of the trapezoidal transform defined in Step (5), map the points A', B', C', and D' from the trapezoid EFGH to R to produce the vertices I, J, K, and L of the intermediate trapezoid (center drawing in FIG. 3), which are constrained to lie with two vertices on the top edge of R and two vertices on the bottom edge of R. Let R'=R. This mapping works because A', B', C', and D' lie on the edges of the trapezoid EFGH and hence will map to the edges of the rectangle R when the inverse map is applied. The point to this step is to find a trapezoid that, when put through the transform from R to EFGH, results in a quadrilateral with corners at A', B', C', and D'.

While the description above has been presented in geometric terms ( e.g., "draw lines"), the process is preferably performed by a computer using analytic geometry implementing equivalent functions.

The example construction above has the happy outcome of placing I and J on the top side of the trapezoid with I on the left, and K and L on the bottom side with K on the right. This corresponds exactly to the distribution of points A, B, C, and D about the corners of the source rectangle. Other distributions of A', B', C', and D', or other choices for sides in Step (3) might not have produced this outcome. However, the necessary correspondence between the corners of the source rectangle ABCD and the corners of the trapezoid formed by I, J, K, and L can be produced by performing appropriate orienting operations to the source rectangle before perform ing the body of the transform, or by performing appropriate orienting transforms to the resulting quadrilateral after the body of the transform. In the presentation that follows, these operations are ignored because they cloud the crux of the inventive method.

Having determined coordinates for E, F, G, H, I, J, K, and L, the pixels of the source rectangle are processed by performing the following steps:

(1) In the first pass, vertical foreshortening warps the source rectangle ABCD to a foreshortened rectangle R" having vertical coordinates matching those of R' and horizontal coordinates matching those of the source rectangle ABCD. The columns in the foreshortened rectangle R" are found by resampling each column of the source image using a resampling function dependent only on vertical coordinates and not on horizontal coordinates. This pass results in the first transformation in Eq. 2:

<u,v>→<u,q>

(2) In the second pass, a horizontal trapezoidal pseudo-shear operation processes each row of foreshortened rectangle R" using uniform resampling in each row to map R" to the intermediate trapezoid formed by I, J, K, and L. Thus, after the first two passes, the source rectangle ABCD has undergone a perspective transformation to the intermediate trapezoid IJKL using only 1-dimensional resampling in each pass. This pass results in the second transformation in Eq. 2:

<u,q>→<p,q>

(3) In the third pass, the pixels in the bounding box for IJKL (i.e., the minimum rectangle bounding IJKL), R' (which may not be equal to R" because of the second pass), undergo horizontal foreshortening which maps them to new locations within R' (referred to as R after this mapping). This pass will change the locations of I, J, K, and L to corresponding points M, N, 0, and P of a foreshortened intermediate trapezoid. This pass results in the third transformation in Eq. 2:

<p,q>→<x,q>

(4) In the fourth pass, the pixels in R undergo a vertical trapezoidal pseudo-shear which transforms the corners of R to E, F, G, and H, and in so doing maps points M, N, O, and P to points A', B', C', and D'. While all pixel locations of R arc operated on during the transformation, many will be "invisible" (be undefined or have no value) because they fall outside the bounds of the real-valued pixels of the target quadrilateral. This pass results in the fourth transformation in Eq. 2:

<x,q>→<x,y>

A property of the above transformations is that the axis-aligned parallel-sided intermediate trapezoid, IJKL, is transformed to the target quadrilateral A', B', C', D' when the bounding box R/R' for the intermediate trapezoid is transformed to the axis-aligned parallel-sided trapezoid EFGH.

The coefficients for the resampling functions in each step can be found using the prior art. Other derivations, including ones based on the relevant transformation matrices, would also fall within the scope of this invention.

After perspective transformation in accordance with the invention, the target quadrilateral can be displayed in conventional fashion and/or operated on by other or similar transformations.

There are a number of degrees of freedom to account for in determining the exact transformation to use. These include whether to perform a horizontal or vertical trapezoidal perspective transform first and which sides to use when deriving the intermediate rectangle in the construction above. Other derivations have similar degrees of freedom. Preliminary or concluding orienting operations may be performed. One can readily enumerate the decisions and use a heuristic metric to pick one set. One such heuristic is to observe that the second trapezoidal perspective transform in the construction above is always a compressing transform. Hence, one should prefer choices that result in a smaller rectangle R, since this will require less compression.

Extensions of the Invention

Figure 4A:
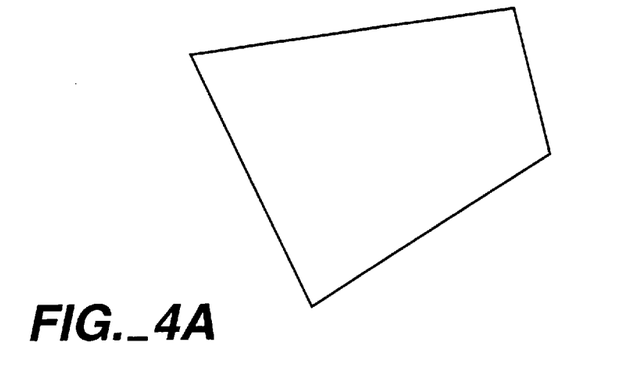
FIG. 4a shows a convex quadrilateral.
Figure 4B:
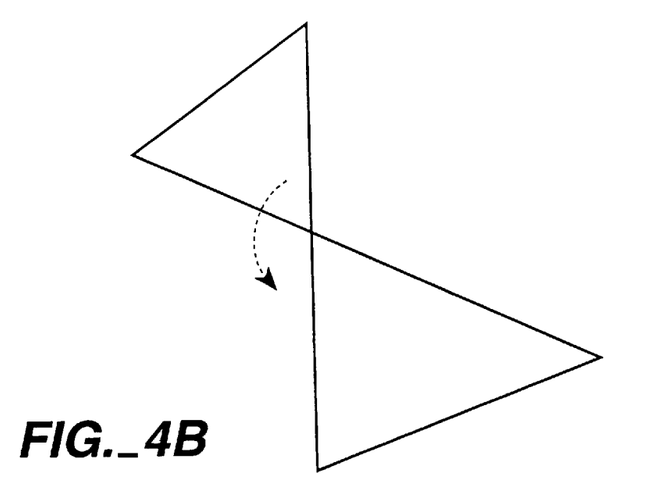
FIG. 4b shows a vertical "hourglass" quadrilateral.
Figure 4C:
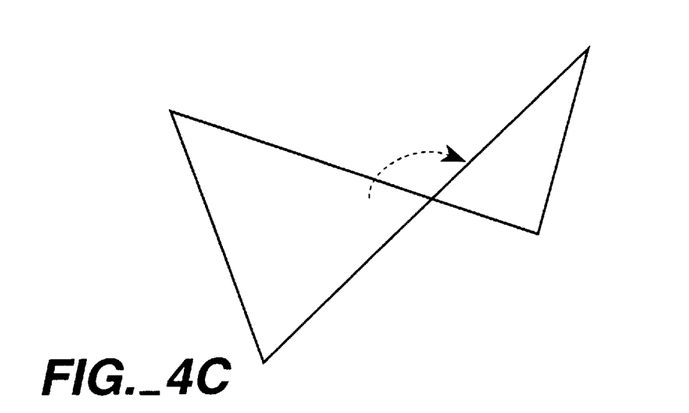
FIG. 4c shows a horizontal "hourglass" quadrilateral.

One significant extension of the invention is the ability to handle not just convex target quadrilaterals but quadrilaterals for which there exist a permutation of the corners which results in a convex quadrilateral. All such quadrilaterals are either convex (FIG. 4a) or take the form of a generally vertical or horizontal hourglass (FIGS. 4b and 4c). Transformations of rectangular images to such target quadrilaterals would be relatively difficult to achieve in the traditional 2-pass perspective transform.

These generalized quadrilaterals can be handled through the following changes to the algorithm presented above. First, note that the trapezoidal pseudo-shear operation can be readily implemented to handle permutably convex target trapezoids since all it relies on is the ability to define lines specifying the beginning and ending location on each row or column (depending on whether the process is proceeding horizontally or vertically). Second, the foreshortening operation can be adjusted so that it is determined based on the length of the parallel sides—i.e., the absolute value of the delta between points rather than simply on the delta. That is, for example, the process uses $|u_j - u_i|$ rather than $u_j - u_i$.

These two changes are applied to the first two passes in the four-pass process, i.e., the intermediate trapezoid may become twisted. Because there may be a need to perform a specific twist to bring the points into a convex form, this may constrain the choice of processing order and orientation operations. The result of this extension is that the image is foreshortened based on the convex permutation of the points but can gain a twist. When the intermediate trapezoid is non-twisted, this changed algorithm performs the same as the perspective transform set forth above. When the intermediate trapezoid is twisted, straight lines are not in general preserved, but the visual effect is as expected. (The reason one cannot perform the twist during the final trapezoidal pseudo-shear is that during that operation, some of the edges of the original rectangle have become interior lines in the intermediate rectangle and a transformation needs to be applied that preserves those straight lines since they define the edge of the rectangular image being transformed.)

Figure 5:
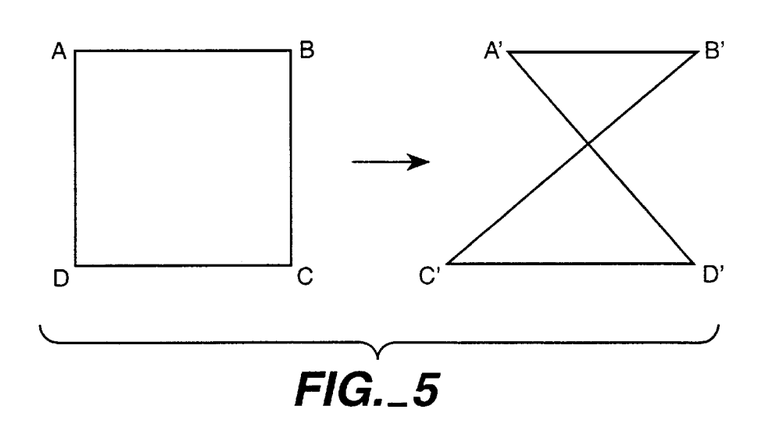
FIG. 5 shows transformation of a rectangle to a nonconvex trapezoid using a trapezoidal pseudo-shear operation to introduce a "twist" into the image.

To better understand this extension of the invention, FIG. 5 shows transformation of a rectangle to a non-convex trapezoid using a trapezoidal pseudo-shear operation to introduce a "twist" into the image. The transformation equation in the horizontal case still has the following form:

$$\langle u, v \rangle \rightarrow \langle du + ev + fuv + g, v \rangle$$

Indeed, unless the trapezoidal pseudo-shear is actually a true shear (i.e., the target is a parallelogram), then at some point a version extended to cover a broader range of vertical coordinates (in the horizontal case) must cross itself, thereby introducing a twist.

As noted above, the problem with a twisted trapezoid is that it becomes impossible to preserve straight lines. For example, the points on the line segment from B' to C' must lie within the transformed quadrilateral, but in the example above, the line segment from B' to C' clearly lies outside the quadrilateral. Thus, when such a twist is introduced, a true perspective transform becomes impossible. However, other effects or characteristics can be preserved. For example, the lines from A to C and from B to D in the original rectangle cross at the halfway point vertically in the rectangle. The transformed curves from A' to C' and from B' to D' clearly cross at the crossover point, and in fact, one can work out that this is the only point of intersection. Thus, to get something approximating a perspective effect, before applying the trapezoidal pseudo-shear operation, a resampling function is applied to each of the columns in the original image such that the middle row of pixels is moved to the same vertical coordinate as the crossover point in the target "trapezoid". The foreshortening mapping will do exactly this, but the way in which the coefficients are derived needs to be modified. From the prior art, it is known that the derivation of the foreshortening mapping largely depends on the ratio of the lengths of the two parallel sides in the final trapezoid. Treating the derivation exactly the same as before, a negative length for one of the sides would be obtained and the resulting mapping function would send the points in the rectangle above and below the trapezoid. This is not desired. If, instead, the absolute values of the lengths—i.e., the length in geometric rather than simple analytic terms—is used, a mapping can be obtained with the desired effects.

Another way to derive this extension is to imagine mapping from the original rectangle to the bounding trapezoid using a foreshortening operation followed by a trapezoidal pseudo-shear and then applying another trapezoidal pseudo-shear to twist the trapezoid. However, the first trapezoidal pseudo-shear can be combined with the twisting operation in a single trapezoidal pseudo-shear operation. This arrives at the same pair of transforms as above. In yet another alternative, the source rectangle can first be twisted and then the appropriate foreshortening and trapezoidal pseudo-shear operations can be applied to map the bounding box for the twisted rectangle to the bounding trapezoid of the target trapezoid. The twist commutes with the foreshortening and combines with the second trapezoidal pseudo-shear, and again the results described above are obtained.

A key point is that, by going beyond the conventional definition and derivation of the perspective transform, a mapping can be obtained from an axis-aligned rectangle to a possibly non-convex trapezoid with parallel sides that are parallel to the corresponding sides in the source rectangle. This mapping can be expressed as a foreshortening operation in combination with a trapezoidal pseudo-shear operation.

Applying this extended version of the rectangle-to-trapezoid perspective transform provides an ability to handle a broader range of shapes. Allowing non-convex trapezoids as the target of the first phase permits handling of permutably convex quadrilaterals—i.e., quadrilaterals that may not be convex in and of themselves but for which there exists an ordering of the points that defines a convex quadrilateral. Allowing non-convex trapezoids as the target for the second phase would also enable handling of these cases, but it would fail to map the straight edges of the original rectangle to the straight edges of the target quadrilateral because a twisting transform does not preserve interior straight lines and some of the edges of the intermediate trapezoid are inside its bounding box. The twisting operation does preserve the straight lines on the edges and hence performing the twist in the first phase does not have this problem. Therefore, generally the system should only twist in the first phase, since twisting in the second gains nothing extra. The derivation of the appropriate transform phases and passes remains the same as the construction presented above, but choices that lead to a non-convex second trapezoid should be rejected.

However, in a further extension, if the target quadrilateral need not have straight edges, one can use a twisting operation in the second pass to create a transformation to an arbitrary, non-degenerate quadrilateral. The results of this transform are somewhat nonintuitive since the resulting image extends outside the target quadrilateral.

The above discussion handles the case where the trapezoid is twisted. It does not handle the case where the trapezoid is really a triangle. In this case and in the cases leading up to it—i.e., where the ratio between the lengths of the sides becomes very small—the foreshortening function becomes very extreme. As a triangle is approached, most of the data gets compressed toward the shorter side, leaving less and less data to be expanded to fill the rest of the result. When a triangle is reached, the denominator of the foreshortening mapping function goes to zero, with the result being that the foreshortening operation maps all points either to the vanishing line or to infinity. To handle these cases more gracefully, the preferred embodiment introduces minimum and maximum values for the ratio of the lengths of the parallel sides used in computing the foreshortening coefficients. When the ratio falls outside this range, the lengths are set or "clamped" to the extreme values. When this occurs, some foreshortening will occur but not enough to preserve straight lines. The loss of preservation of straight lines, however, is generally preferable to the severely asymptotic behavior of the foreshortening function when one of the sides becomes extremely short relative to the other.

Note also that, while the individual passes described above have been defined as working only on the pixels in a source rectangle and its successors, the passes can be generalized to handle other rectangles. For example, a user might want to specify the transform for a larger rectangle by specifying a target quadrilateral for a smaller rectangle contained within the larger one. A user might also want to simultaneously transform two nonoverlapping rectangles based on the transformation defined by mapping one rectangle to a particular quadrilateral.

The equation for a horizontal trapezoidal pseudo-shear operation is well defined as a forward map at all coordinates and has no dependence on its input rectangle. The vertical foreshortening operation is also well-defined over more coordinates than are in the source rectangle. The vertical foreshortening operation does, however, have a problem when the denominator goes to zero. At this point, the pixels are mapped to positive or negative infinity. Worse still, passing this point in the vertical direction, the mapping coordinates start coming back from the opposite infinity—i.e., the mapping wraps around at infinity.

The problem with the denominator going to zero can be fixed in a couple of ways. One way is to introduce a cutoff on vertical source coordinates before the zero point is reached. As a result of this change, some portions of the extended source data may not appear in the resampled result. Another fix is to use the correct foreshortening equation over part of its domain and replace it with a better behaved function over other parts of its domain. For example, the system could choose a cutover point at which the foreshortening function is replaced with a linear function with the same slope as the foreshortening function at the point where cutover to the linear function occurs. The result in this case would be that straight lines would not be preserved past the cutover point.

The vertical trapezoidal pseudo-shear and horizontal foreshortening operations can be similarly extended. The unmodified trapezoidal pseudo-shear and the modified foreshortening operation can then be used to transform arbitrary rectangles. A source rectangle and a target quadrilateral are used to determine a sequence of 4 passes. Transformation passes extended as described above are then applied to an image bounded by some rectangle X, which is not necessarily the same as the source rectangle. The first foreshortening operation maps rectangle X to another rectangle; the first trapezoidal pseudo-shear operation maps that rectangle to a trapezoid; the second foreshortening operation maps the bounding box of that trapezoid to another rectangle; and the final trapezoidal pseudo-shear operation maps that rectangle to a final trapezoid in such a way that if the corners of the source rectangle are contained within rectangle X, they will have been transformed to the corresponding corners of the target quadrilateral. Furthermore, unless the transformation ventures into the range where the foreshortening operation has been modified to deal with near zero denominators, the resulting transform is a perspective transform on rectangle X.

Another extension to consider is folding together the second (trapezoidal pseudo-shear) and third (foreshortening) resampling operations since these are either both horizontal or both vertical. Thus, referring to Eq. 2, the combined resampling operation would be:

<u,q> → <x,q>

This results in fewer resampling operations. It preserves the stability that comes from having simply defined intermediate shapes, but it loses the computational optimizations because one must now do considerable mathematics per pixel rather than per row or per column.

Another approach to combining passes comes from setting up a form of pipeline. Starting with a horizontal trapezoidal perspective transform (starting with the vertical perspective transform is analogous), the initial vertical foreshortening operation can be implemented to produce a series of rows. Each of these rows can be subjected to the appropriate resampling for the horizontal trapezoidal pseudo-shear operation and then subsequently to the horizontal foreshortening operation. By pipelining the operations in this way, only one intermediate image is needed instead of three. The last stage can also be combined into the process but becomes considerably more complicated since the system must maintain incremental sampling information for each column in the vertical trapezoidal pseudo-shear operation.

Implementation

The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g, ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Summary

The invention comprises a method for performing perspective transformations on images using multiple passes of 1-dimensional sampling that involve less computation per pixel when resampling, is easier to make numerically (and hence graphically) stable, and is amenable to a variety of extensions that allow it to handle quadrilaterals not allowed under the conventional perspective transformation.

A number of embodiments of the present invention have been described. Nevertheless, it will be understood that various modifications may be made without departing from the spirit and scope of the invention. For example, while all coordinates in this description have been assumed to be Cartesian, other coordinate systems could be used. Accordingly, it is to be understood that the invention is not to be limited by the specific illustrated embodiment, but only by the scope of the appended claims.

What is claimed is:

1. A computerized method of perspective transformation of an axis-aligned source rectangle represented in a computer by a plurality of pixels, each having coordinates <u, v>, to a target quadrilateral represented in the computer by a plurality of pixels, each having coordinates <x,y>, including the steps of:

(a) applying a first phase transformation, comprising two one-dimensional resampling processes, to the pixels <u, v> of the source rectangle to generate an intermediate trapezoid, represented by a plurality of pixels <p,q>, with axis-aligned parallel sides; and (b) applying a second phase transformation, comprising two one-dimensional resampling processes, to the pixels of a rectangle bounding the pixels of the intermediate trapezoid to generate a target trapezoid with axis-aligned parallel sides, the target trapezoid bounding the target quadrilateral.

2. The method of claim 1, wherein the two one-dimensional resampling processes of the first phase comprise a foreshortening process in a first dimension and a trapezoidal pseudo-shear process in a second dimension.

3. The method of claim 2, wherein the two one-dimensional resampling processes of the second phase comprise a foreshortening process in the second dimension and a trapezoidal pseudo-shear process in the first dimension.

4. A computerized method of perspective transformation of an axis-aligned source rectangle represented in a computer by a plurality of pixels, each having coordinates <u, v>, to a target quadrilateral represented in the computer by a plurality of pixels, each having coordinates <x, y>, including the steps of:

(a) performing a one-dimensional resampling process comprising a foreshortening, in a first dimension, of the source rectangle to generate a foreshortened rectangle represented by a plurality pixels;

(b) performing a one-dimensional resampling process comprising a trapezoidal pseudo-shear, in a second dimension, of the foreshortened rectangle to generate an intermediate trapezoid, with axis-aligned parallel sides, represented by a plurality pixels;

(c) performing a one-dimensional resampling process comprising a foreshortening, in the second dimension, of a first rectangle bounding the intermediate trapezoid to generate a second rectangle bounding a foreshortened intermediate trapezoid represented by a plurality pixels; and (d) performing a one-dimensional resampling process comprising a trapezoidal pseudo-shear, in the first dimension, of the second rectangle bounding the foreshortened intermediate trapezoid to generate a target trapezoid, with axis-aligned parallel sides, the target trapezoid bounding the target quadrilateral.

5. The method of claim 4, further including the steps of:

(a) determining a parallel-sided trapezoid bounding the target quadrilateral;

(b) determining a rectangle bounding the parallel-sided trapezoid bounding the target quadrilateral, such rectangle being the second rectangle;

(c) determining coefficients for a perspective transformation resampling function that transforms the second rectangle to the axis-aligned parallel-sided trapezoid bounding the target quadrilateral; and (d) determining the inverse of the determined resampling function;

(e) applying the inverse of the determined resampling function to map the corners of the target quadrilateral to the intermediate trapezoid.

6. The method of claim 4, wherein steps (b) and (c) are combined as a single one-dimensional resampling process.

7. The method of claim 4, wherein each one-dimensional resampling process has an input for receiving pixels, and an output for generated pixels, wherein the output of the one-dimensional resampling process of step (a) is pipelined to the input of the one-dimensional resampling process of step (b).

8. The method of claim 4, wherein each one-dimensional resampling process has an input for receiving pixels, and an output for generated pixels, wherein the output of the one-dimensional resampling process of step (b) is pipelined to the input of the one-dimensional resampling process of step (c).

9. The method of claim 4, wherein each one-dimensional resampling process has an input for receiving pixels, and an output for generated pixels, wherein the output of the one-dimensional resampling process of step (a) is pipelined to the input of the one-dimensional resampling process of step (b), and the output of the one-dimensional resampling process of step (b) is pipelined to the input of the one-dimensional resampling process of step (c).

10. The method of claim 1 or claim 4, further including the step of displaying the pixels representing the target quadrilateral.

11. The method of claim 1 or claim 4, wherein the intermediate trapezoid is non-convex and the target quadrilateral is permutably convex.

12. The method of claim 1 or claim 4, wherein at least one of the intermediate trapezoid and the target trapezoid is non-convex.

13. The method of claim 4, wherein the one-dimensional resampling process comprising a foreshortening, in the second dimension, of the first rectangle bounding the intermediate trapezoid is limited to avoid excessive compression or expansion.

14. The method of claim 13, wherein the ratio of the lengths of the parallel sides of the intermediate trapezoid is constrained to be within a selected maximum and a selected minimum value, thereby avoiding excessive compression or expansion.

15. The method of claim 4, wherein the one-dimensional resampling process comprising a foreshortening, in a first dimension, is applied to a rectangle other than the source rectangle.

16. A computerized system of perspective transformation of an axis-aligned source rectangle represented in a computer by a plurality of pixels, each having coordinates <u, v>, to a target quadrilateral represented in the computer by a plurality of pixels, each having coordinates <x, y>, including:
(a) means for applying a first phase transformation, comprising two one-dimensional resampling processes, to the pixels <u, v> of the source rectangle to generate an intermediate trapezoid, represented by a plurality of pixels <p, q>, with axis-aligned parallel sides; and
(b) means for applying a second phase transformation, comprising two one-dimensional resampling processes, to the pixels of a rectangle bounding the pixels of the intermediate trapezoid to generate a target trapezoid with axis-aligned parallel sides, the target trapezoid bounding the target quadrilateral.

17. The system of claim 16, wherein the two one-dimensional resampling processes of the first phase comprise a foreshortening process in a first dimension and a trapezoidal pseudo-shear process in a second dimension.

18. The system of claim 17, wherein the two one-dimensional resampling processes of the second phase comprise a foreshortening process in the second dimension and a trapezoidal pseudo-shear process in the first dimension.

19. A computerized system of perspective transformation of an axis-aligned source rectangle represented in a computer by a plurality of pixels, each having coordinates <u, v>, to a target quadrilateral represented in the computer by a plurality of pixels, each having coordinates <x, y>, including:
(a) means for performing a one-dimensional resampling process comprising a foreshortening, in a first dimension, of the source rectangle to generate a foreshortened rectangle represented by a plurality pixels;
(b) means for performing a one-dimensional resampling process comprising a trapezoidal pseudo-shear, in a second dimension, of the foreshortened rectangle to generate an intermediate trapezoid, with axis-aligned parallel sides, represented by a plurality pixels;
(c) means for performing a one-dimensional resampling process comprising a foreshortening, in the second dimension, of a first rectangle bounding the intermediate trapezoid to generate a second rectangle bounding a foreshortened intermediate trapezoid represented by a plurality pixels; and
(d) means for performing a one-dimensional resampling process comprising a trapezoidal pseudo-shear, in the first dimension, of the second rectangle bounding the foreshortened intermediate trapezoid to generate a target trapezoid, with axis-aligned parallel sides, the target trapezoid bounding the target quadrilateral.

20. The system of claim 19, further including:
(a) means for determining a parallel-sided trapezoid bounding the target quadrilateral;
(b) means for determining a rectangle bounding the parallel-sided trapezoid bounding the target quadrilateral, such rectangle being the second rectangle;
(c) means for determining coefficients for a perspective transformation resampling function that transforms the second rectangle to the axis-aligned parallel-sided trapezoid bounding the target quadrilateral; and
(d) means for determining the inverse of the determined resampling function;
(e) means for applying the inverse of the determined resampling function to map the corners of the target quadrilateral to the intermediate trapezoid.

21. The system of claim 19, wherein the means of element (b) and (c) are combined to perform a single one-dimensional resampling process.

22. The system of claim 19, wherein each one-dimensional resampling process has an input for receiving pixels, and an output for generated pixels, wherein the output of the one-dimensional resampling process of element (a) is pipelined to the input of the one-dimensional resampling process of element (b).

23. The system of claim 19, wherein each one-dimensional resampling process has an input for receiving pixels, and an output for generated pixels, wherein the output of the one-dimensional resampling process of element (b) is pipelined to the input of the one-dimensional resampling process of element (c).

24. The system of claim 19, wherein each one-dimensional resampling process has an input for receiving pixels, and an output for generated pixels, wherein the output of the one-dimensional resampling process of element (a) is pipelined to the input of the one-dimensional resampling process of element (b), and the output of the one-dimensional resampling process of element (b) is pipelined to the input of the one-dimensional resampling process of element (c).

25. The system of claim 16 or claim 19, further including means for displaying the pixels representing the target quadrilateral.

26. The system of claim 16 or claim 19, wherein the intermediate trapezoid is non-convex and the target quadrilateral is permutably convex.

27. The system of claim 16 or claim 19, wherein at least one of the intermediate trapezoid and the target trapezoid is non-convex.

28. The system of claim 19, wherein the one-dimensional resampling process comprising a foreshortening, in the second dimension, of the first rectangle bounding the intermediate trapezoid is limited to avoid excessive compression or expansion.

29. The system of claim 28, wherein the ratio of the lengths of the parallel sides of the intermediate trapezoid is constrained to be within a selected maximum and a selected minimum value, thereby avoiding excessive compression or expansion.

30. The system of claim 19, wherein the one-dimensional resampling process comprising a foreshortening, in a first dimension, is applied to a rectangle other than the source rectangle.

31. A computer program, residing on a computer-readable medium, for perspective transformation of an axis-aligned source rectangle represented in a computer by a plurality of pixels, each having coordinates <u, v>, to a target quadrilateral represented in the computer by a plurality of pixels, each having coordinates <x, y>, the computer program comprising instructions for causing a computer to:

(a) apply a first phase transformation, comprising two one-dimensional resampling processes, to the pixels <u, v> of the source rectangle to generate an intermediate trapezoid, represented by a plurality of pixels <p, q>, with axis-aligned parallel sides; and (b) apply a second phase transformation, comprising two one-dimensional resampling processes, to the pixels of a rectangle bounding the pixels of the intermediate trapezoid to generate a target trapezoid with axis-aligned parallel sides, the target trapezoid bounding the target quadrilateral.

32. The computer program of claim 31, wherein the two one-dimensional resampling processes of the first phase comprise a foreshortening process in a first dimension and a trapezoidal pseudo-shear process in a second dimension.

33. The computer program of claim 32, wherein the two one-dimensional resampling processes of the second phase comprise a foreshortening process in the second dimension and a trapezoidal pseudo-shear process in the first dimension.

34. A computer program, residing on a computer-readable medium, for perspective transformation of an axis-aligned source rectangle represented in a computer by a plurality of pixels, each having coordinates <u, v>, to a target quadrilateral represented in the computer by a plurality of pixels, each having coordinates <x, y>, the computer program comprising instructions for causing a computer to:

(a) perform a one-dimensional resampling process comprising a foreshortening, in a first dimension, of the source rectangle to generate a foreshortened rectangle represented by a plurality pixels;

(b) perform a one-dimensional resampling process comprising a trapezoidal pseudo-shear, in a second dimension, of the foreshortened rectangle to generate an intermediate trapezoid, with axis-aligned parallel sides, represented by a plurality pixels;

(c) perform a one-dimensional resampling process comprising a foreshortening, in the second dimension, of a first rectangle bounding the intermediate trapezoid to generate a second rectangle bounding a foreshortened intermediate trapezoid represented by a plurality pixels; and (d) perform a one-dimensional resampling process comprising a trapezoidal pseudo-shear, in the first dimension, of the second rectangle bounding the foreshortened intermediate trapezoid to generate a target trapezoid, with axis-aligned parallel sides, the target trapezoid bounding the target quadrilateral.

35. The computer program of claim 34, further comprising instructions for causing a computer to:

(a) determine a parallel-sided trapezoid bounding the target quadrilateral;

(b) determine a rectangle bounding the parallel-sided trapezoid bounding the target quadrilateral, such rectangle being the second rectangle;

(c) determine coefficients for a perspective transformation resampling function that transforms the second rectangle to the axis-aligned parallel-sided trapezoid bounding the target quadrilateral; and (d) determine the inverse of the determined resampling function;

(e) apply the inverse of the determined resampling function to map the corners of the target quadrilateral to the intermediate trapezoid.

36. The computer program of claim 34, wherein elements (b) and (c) are combined as a single one-dimensional resampling process.

37. The computer program of claim 34, wherein each one-dimensional resampling process has an input for receiving pixels, and an output for generated pixels, wherein the output of the one-dimensional resampling process of element (a) is pipelined to the input of the one-dimensional resampling process of element (b).

38. The computer program of claim 34, wherein each one-dimensional resampling process has an input for receiving pixels, and an output for generated pixels, wherein the output of the one-dimensional resampling process of element (b) is pipelined to the input of the one-dimensional resampling process of element (c).

39. The computer program of claim 34, wherein each one-dimensional resampling process has an input for receiving pixels, and an output for generated pixels, wherein the output of the one-dimensional resampling process of element (a) is pipelined to the input of the one-dimensional resampling process of element (b), and the output of the one-dimensional resampling process of element (b) is pipelined to the input of the one-dimensional resampling process of element (c).

40. The computer program of claim 31 or claim 34, further comprising instructions for causing a computer to display the pixels representing the target quadrilateral.

41. The computer program of claim 31 or claim 34, wherein the intermediate trapezoid is non-convex and the target quadrilateral is permutably convex.

42. The computer program of claim 31 or claim 34, wherein at least one of the intermediate trapezoid and the target trapezoid is non-convex.

43. The computer program of claim 34, wherein the one-dimensional resampling process comprising a foreshortening, in the second dimension, of the first rectangle bounding the intermediate trapezoid is limited to avoid excessive compression or expansion.

44. The computer program of claim 43, wherein the ratio of the lengths of the parallel sides of the intermediate trapezoid is constrained to be within a selected maximum and a selected minimum value, thereby avoiding excessive compression or expansion.

45. The computer program of claim 34, wherein the one-dimensional resampling process comprising a foreshortening, in a first dimension, is applied to a rectangle other than the source rectangle.

* * * * *